United States Patent
Reinders et al.

[11] Patent Number: 5,897,660
[45] Date of Patent: Apr. 27, 1999

[54] METHOD FOR MANAGING FREE PHYSICAL PAGES THAT REDUCES TRASHING TO IMPROVE SYSTEM PERFORMANCE

[75] Inventors: James Reinders, Beaverton; Joe Bonasera, Portland, both of Oreg.

[73] Assignee: Intel Corporation, Santa Clara, Calif.

[21] Appl. No.: 08/418,406

[22] Filed: Apr. 7, 1995

[51] Int. Cl.$^6$ ........................................... G06F 12/08
[52] U.S. Cl. ........................... 711/170; 711/173; 711/209
[58] Field of Search ................... 395/406, 412, 395/413, 419, 497, 416, 403, 417, 418

[56] References Cited

U.S. PATENT DOCUMENTS

| | | | |
|---|---|---|---|
| 4,737,909 | 4/1988 | Harada | 711/3 |
| 5,125,086 | 6/1992 | Perazzoli, Jr. | 395/486 |
| 5,339,411 | 8/1994 | Heaton, Jr. | 711/171 |
| 5,479,627 | 12/1995 | Khalidi et al. | 711/205 |
| 5,561,786 | 10/1996 | Morse | 395/497.01 |
| 5,577,243 | 11/1996 | Sherwood er al. | 395/607 |

Primary Examiner—Eddie P. Chan
Assistant Examiner—Gary J. Portka
Attorney, Agent, or Firm—Blakely, Sokoloff, Taylor & Zafman

[57] ABSTRACT

The present invention overcomes the drawbacks of conventional operating system implementations of virtual to physical memory address mapping by providing a method for free physical page management and translation of virtual addresses to physical addresses that increases the effectiveness of the cache memory by reducing the thrashing caused by unfavorable mapping of virtual to physical addresses.

12 Claims, 8 Drawing Sheets

METHOD FOR MANAGING FREE PHYSICAL PAGES THAT REDUCES TRASHING TO IMPROVE SYSTEM PERFORMANCE

BACKGROUND OF THE INVENTION

1. Field of the Invention

The present invention relates to the field of operating systems, and in particular to a method for managing free physical memory pages that reduces the thrashing, caused by unfavorable mapping of virtual to physical addresses, thereby increasing the effectiveness of cache memory.

2. Description of the Related Art

Figure 1:
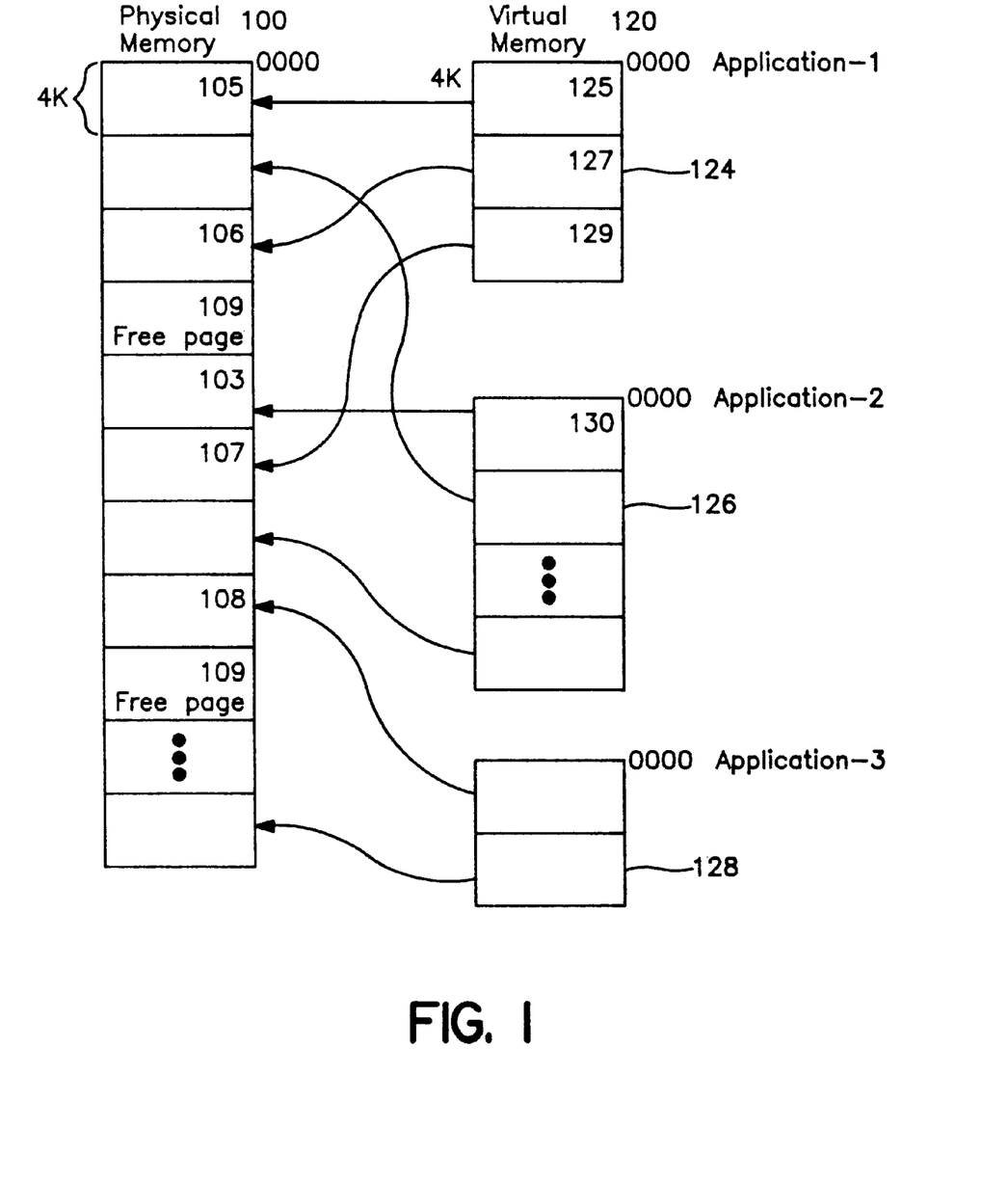
FIG. 1 illustrates a conventional mapping of virtual pages of different concurrent processes into corresponding pages in the physical memory.

It is common in the art for an operating system to divide memory into pages of a specified length. For example, an operating system may divide memory into 4K pages. FIG. 1 illustrates how both physical memory and virtual memory are divided into 4K pages. Physical memory 100 is divided into a number of 4K pages. Physical memory is usually implemented with a number of RAM or DRAM chips. Physical memory 100 is addressed by physical memory addresses typically beginning with zero (0000) and extending to some memory address that corresponds to the size of the physical memory.

Virtual memory 120 includes a number of applications 124, 126, and 128. At any one time, the computer processor may be running any number of applications such as a word processing program, a spreadsheet program, and a window management program. It appears to each of these applications as if that application has access to a number of virtual memory pages typically beginning with a memory address zero and ending at some memory address that corresponds to the size of the application. Each application may include a number of virtual memory pages. For example application 124 includes 3 virtual memory pages 125, 127, and 129.

The operating system maps each of the virtual memory pages onto a physical memory page. For example, an operating system would translate the virtual memory pages 125, 127 and 129 in an application to their respective physical memory pages 105, 106, and 107.

Although it appears to each application that its memory pages begin at memory address zero, and such pages are consecutive, in fact, the operating system maps these virtual memory pages into physical memory pages that are not necessarily contiguous or consecutive. In fact, a virtual page 130 that appears to an application 126 to begin at address zero may in fact be mapped by the operating system into a physical memory page that begins at some non-zero address.

At any one time, the physical memory may include a number of free pages 109. These free pages 109 are pages in physical memory that are not being used by any of the applications running on the computer.

In the prior art, these free pages are organized as a linked list having a variable that points to the beginning of the list. Whenever an application required an additional physical page of physical memory, the operating system would map the virtual memory page onto that free physical memory page. The choice of which free page to allocate to the virtual page was "random" in the sense that the first free page was always allocated. The word, "random", denotes the lack of any purposeful correlation between the virtual and physical memory addresses during the mapping process. The word, "random", is not used to comment on or guarantee the actual distribution of the free pages. Similarly, when an application is finished with a physical page of memory, that free page is appended to the end of the linked list in a random and non-deterministic order.

Referring to FIG. 1, an operating system divides memory into 4K pages. Physical-memory 100 is partitioned into 4K pages (i.e., 105, 103 and 108). Similarly, virtual memory is partitioned into 4K pages. Various applications 124, 126, and 128 reside in virtual memory. As can be seen in FIG. 1, the operating system kernel maps the various pages in virtual memory of different applications (124, 126 and 128) to pages in the physical memory. Although it appears to application 124 that it resides in three consecutive and contiguous pages beginning with page 125, beginning at address of zero, in fact, the 3 pages in virtual memory of application 124 may map anywhere into the physical memory.

In general, an operating system usually defines the structure of a virtual address as having two fields. A plurality of bits are set aside to identify the virtual page number. Also, a plurality of bits are set aside to identify the byte offset from the beginning of that particular page. An application running an operating system (assuming a 32 bit memory address and 4K pages) may use a virtual addresses of the form: 0xVVVVVSSS, where VVVVV (bits 31:12) identify the virtual page number, and SSS (bits 11:0) are the byte offset of the address within the page.

Figure 2A:
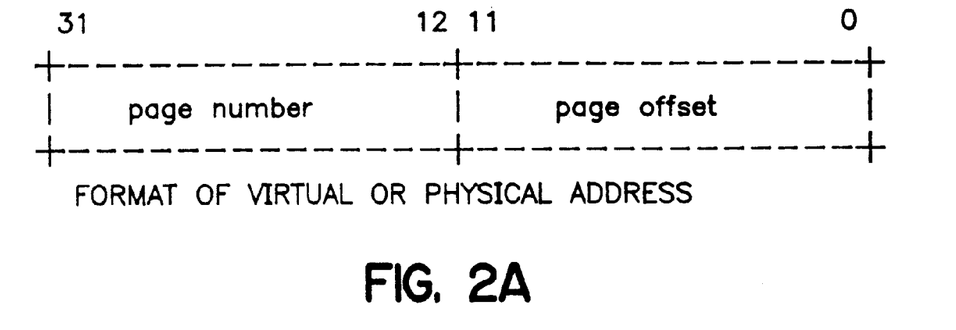
FIG. 2A illustrates typical fields in a virtual or physical memory address.

Referring to FIG. 2A, the page number is represented by bits 31 through 12, and the page offset is represented by bits 11:0. Please note that each V and S represents four bits in the address. The kernel of the operating system in conjunction with the virtual memory facilities maps the virtual address, 0xVVVVVSSS, into a physical address of the form: 0xQQQQQSSS. This physical address includes QQQQQ (bits 31:12) that identify the physical page number; and SSS (bits 11:0) that identify the offset of the address within the page.

Figure 2B:
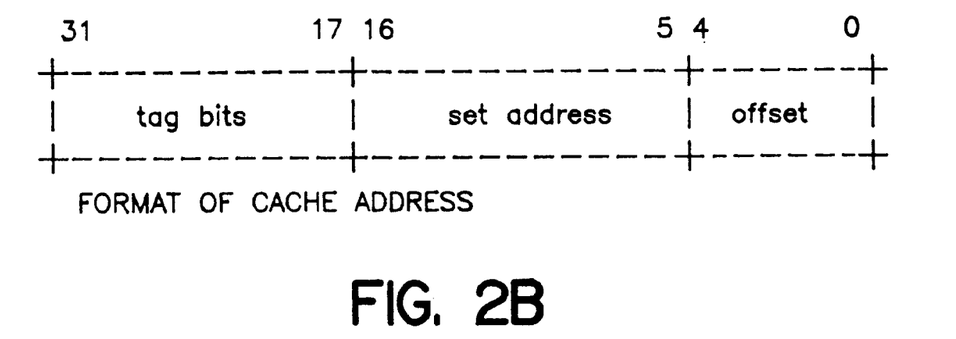
FIG. 2B illustrates typical fields in a cache memory address.

A computer system often includes a cache. An operating system supporting a cache specifies and defines several fields within the physical memory address used to access the cache (FIG. 2B). Customarily, each memory address, addressing a cache location includes a tag field having a plurality of bits that will be compared with the tag bits of a cache directory, which are stored at the same set address. When matching tags are found by the cache controller, the data within the cache at the same set address represents the contents of the main memory location being accessed. Another common field in the physical address is the set address field also commonly known as the index field, which is used to select the set (i.e., the row within the cache). Also, a block-offset field, which is used to select the desired data from that block, (i.e., this is also known as the subline field) is also frequently used.

In one embodiment of the present invention the physical address includes a tag field, a set address field, and a block-offset (i.e., subline) field. Referring to FIG. 2B, Bits 31:17 represent the address tag field. Bits 16:5 represent the cache set address field, and bits 4:0 represent an align offset field. When the kernel maps the virtual address into the physical address, the lower twelve bits represented by SSS remain unchanged. In other words, the page offset in the virtual address maps directly to bits 11:0 of the physical address.

When the kernel assigns physical addresses to virtual addresses, cache set address bits 11:5 are guaranteed to be unchanged since bits 11:0 are identical in the physical and virtual addresses. However, an important observation is that bits 16:12 of the set address are subject to other arbitrary changes as they map from a virtual to a physical address depending on the kernel's memory page management scheme.

The arbitrary mapping of address bits 16:12 makes it impossible for user-level tools, such as a compiler which optimizes code, to predictably reduce cache conflicts for arrays and other objects that are greater than 4K in size. In other words, it is impossible for an optimizing compiler to modify the program (i.e., the layout of the data in the program) in order to reduce the cache conflicts, which occur during run time. In an architecture with 4k page sizes, any data structure smaller than 4K in size can be placed in a single page. Thus, data objects less than a page in size would never conflict with itself in a cache. As mentioned previously, any data conflicts would occur between pages.

In a computer system which uses a small cache, the number of rows could easily be addressed by bits 11:0. In other words, if the set address field, which indexes the rows in a cache, is small due to the small size of the cache, and the set address field on the block offset field together only use twelve bits (11:0) or fewer, then the problem of the arbitrary mapping of address bits from virtual to physical addresses would not exist. In other words, a one-to-one correspondence is automatically enforced because the page offset bits 11:0 pass through unchanged from the virtual to the physical address.

However, as cache size increases, there comes a point where to properly address a cache, the number of bits in the set address field and block offset field together may exceed the number of bits in the page offset in the memory address. An arbitrary/random mapping of these additional address bits beyond the number of bits in the page offset increases thrashing and reduces the effective size of a cache.

The effect of this random allocation of free physical memory pages becomes pronounced in systems which use cache memories to decrease average latency to access data. When a cache is implemented into the computer system to improve the performance of the computer system, this random allocation of free physical memory pages adversely decreases the effective size of the cache.

As a general rule, the larger the cache memory implemented in a computer system, the greater the increase in the performance and throughput. However, when the cache can hold more than one physical memory page, then the effect of the "random" page management (i.e., a non-deterministic virtual to physical memory address mapping) causes the under-utilization of the cache memory, thereby reducing the realized benefit from the cache memory.

For example, when there is a particular physical memory page that is heavily accessed (read and/or written) we refer to that as a "hot" page. A "hot" page is a page which is accessed much more often in some period of time than the majority of other pages which are accessed. A "hot" physical memory page will naturally by cached piece by piece (i.e., a cache line at a time) into the cache. This cache activity results in a copy of the entire page exiting in the cache. Likewise, if there is a second "hot" physical memory page, this physical memory page will also get coped into the cache. It is important to keep in mind that caches typically cache things much smaller than a page (e.g., a cache line may be 32 bytes in size, and a page may be 4096 bytes). When there are no conflicts in allocating cache lines, two "hot" pages could co-exist in cache simultaneously having been copied to the cache one line at a time.

When a cache memory can hold no more than one physical memory page, the problems of under-utilization and conflict over blocks in the cache are non-existent because the small size of the cache precludes these two problems. However, when the cache is large enough to hold many physical memory pages, these two problems can occur.

First, under-utilization of the cache memory is a persistent problem. Since the free physical memory pages are managed in a "random" way, there will be spaces in the cache which are used very frequently, whereas other areas in the cache are used less frequently or not at all. Moreover, the utilization of cache memory will vary each time the application is run because the free physical pages are randomly allocated.

Not only are the run times inconsistent because of this non-deterministic effect, injected by this random virtual to physical memory address mapping, but the effective size of the cache is also reduced by some random non-deterministic amount. For example, it is reasonably certain that on any particular run, certain spaces within the cache are used very frequently while others are not accessed frequently or may not be used at all.

A second problem is best illustrated with an example. Returning to the previous example where there are two or more "hot" memory pages, the cache ideally would hold a copy of each "hot" page in the cache memory. This results from the fact that a "hot" physical memory page will naturally be cached piece by piece (i.e., a cache line at a time) into the cache. This cache activity results in a copy of the entire page existing in the cache, assuming that no conflicts occur while allocating all the cache lines within the cache for that page.

For the first "hot" page, there is a 100% probability that a space in a cache memory will be found. The reason for this is that none of the cache memory is being used. Thus, over time, the first hot page will reside completely in a contiguous area within the cache memory.

The second hot page has a probability of $(N-1)/N \times 100\%$ in finding an area inside the cache memory without accessing the same location that is used by the first "hot" page, assuming a direct mapped cache. Set associative caches have a corresponding problem. However, the decrease in probability is much more difficult to describe mathematically. Nonetheless, the probability correspondingly decreases as the number of hot pages increases. N simply represents the number of rows in a cache. It is evident that in either case, direct mapped cache or set associative cache, as the number of hot pages increases, the probability of the next hot page finding a space within cache memory not used by any of the other hot pages decreases dramatically.

With a random memory page management allocation scheme, the chance for a hot page to be loaded into an area in cache memory in which resides another hot page increases with the number of "hot" pages used.

This effect of displacing one hot page with another hot page is commonly referred to as thrashing. The effect of thrashing is that additional loads and stores to memory are required to access data in both of those hot pages in cache memory. As the number of loads and stores (the number of accesses to main memory) increases, the traffic on the memory bus increases, thereby decreasing throughput of the computer system.

SUMMARY OF THE INVENTION

The present invention is a method for page allocation that maintains a one-to-one correspondence between more bits as the operating system translates or maps virtual memory addresses to physical memory addresses. This method reduces the thrashing caused by unfavorable mappings of virtual to physical addresses. This method increases the effectiveness of the cache memory. In one embodiment of the invention, instead of having one pointer point to one list of available free pages, one may use $2^x$ separate pointers and lists with each pointer pointing to a list of free pages according to a correlation field having x number of bits. In another embodiment of this invention, the $2^x$ linked lists are maintained in a ring so that a page allocated from the list is the least recently used of the pages in the list. In another embodiment of this invention, an offset is used for every mapping of a page for a particular process, solving the problem of the guaranteed conflict between zero pages of all processes and also solving the problem of exhaustion of the first list disproportionately over other page lists.

BRIEF DESCRIPTION OF THE DRAWINGS

The objects, features and advantages of the present invention are described in the following detailed description in which.

DETAILED DESCRIPTION

The following detailed description sets forth an embodiment or embodiments in accordance with the present invention for a method of mapping a virtual memory address to a physical memory address that reduces the thrashing caused by unfavorable mappings, thereby increasing the effectiveness of cache memory. In the following description, details are set forth in order to provide a thorough understanding of the present invention. It is evident, however, that the present invention may be practiced without these details. In other instances, well known elements, devices, steps and the like are not set forth in detail in order to avoid unnecessarily obscuring the present invention.

In the present invention the operating system defines a correlation field in the virtual memory address and a corresponding correlation field in the virtual memory address. When the operating system translates the physical memory address to the physical memory address, it maintains a one-to-one correspondence between the correlation field of the virtual memory address and the correlation field of the physical memory address. In so doing, instead of a random mapping of the correlation field bits, a one-to-one correspondence is maintained.

The present invention ensures this one-to-one correspondence by defining thirty-two variables that each point to a separate list. The number of lists is derived from the number of bits in the correlation field. Specifically, the number of lists equals $2^X$, where X is the number of bits in the correlation field. Since X equals five in this specific embodiment, there are $2^5$ or thirty-two separate lists. Lists one through thirty-two are each pointed to by a separate variable.

When an application requests an additional page of memory, the operating system allocates a free physical page by checking the correlation field in the virtual memory address. Based on the correlation field in the virtual memory address, the operating system will allocate a free physical memory page from the list indicated by the correlation field in the virtual memory address. Similarly, when a page in physical memory is no longer used by an application, the operating system releases the physical page to the appropriate list. The operating system uses the correlation field in the physical memory address to determine the appropriate list to release the physical memory page to.

By maintaining a one-to-one correspondence between the correlation field of the virtual memory address and the correlation field of the physical memory address during translation, the present invention solves the two problems discussed above in the description of the related art. First, the present invention significantly reduces the likelihood that one part of the cache memory is not overly used, while another part of cache memory is used very infrequently or not used at all. The one-to-one correspondence promotes a more even use of all memory locations inside the cache. Thus, the overall use of the cache is improved.

Furthermore, this one-to-one correspondence promotes a more stable and more consistent run time for the applications. Since the present invention imposes a non-random and deterministic method of allocating free physical pages, the applications execute and complete in a much more consistent fashion. In other words, the run-times of each application do not vary as drastically because of this ordered allocation of free pages.

Second, the present invention reduces the amount of thrashing within the cache memory because the likelihood that a hot page will displace another hot page can be diminished so that by static placement selection (by an optimizing compiler) the first and second hot pages will reside in different parts of the cache memory. The ability for static placement selection to be used to control thrashing is possible because the correlation bits are individually tracked, and the hot pages can be separated from each other in the cache.

Figure 3:
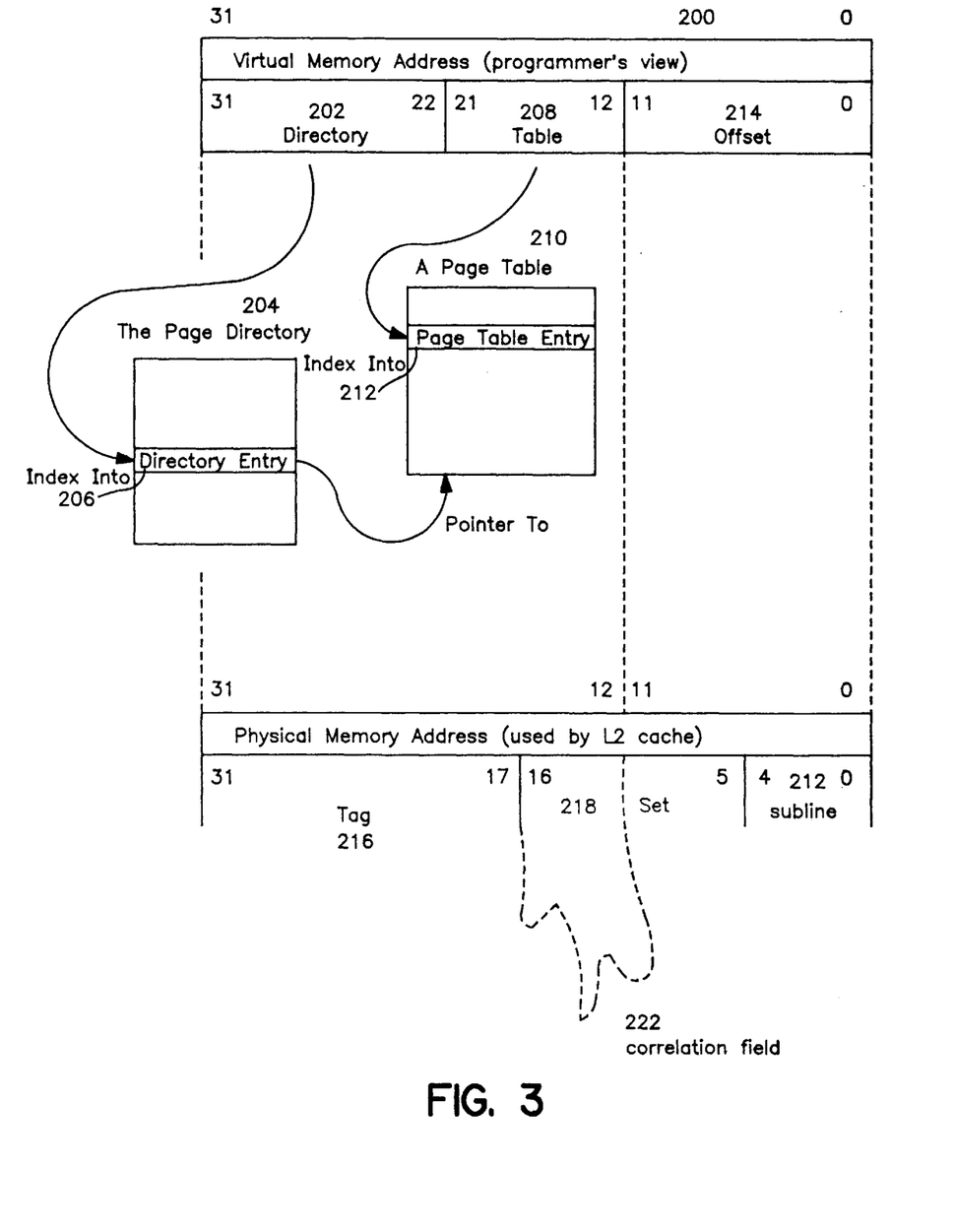
FIG. 3 illustrates a programmer's view of a virtual memory address, its corresponding bits fields, and its translation through a page directory and page table to a corresponding physical memory address, with its corresponding bit fields.

Referring now to FIG. 3, a programmer's view of a virtual memory address is shown. Bits 31:22 represent the directory field 202, which points to a directory entry 206 located in the page directory 204. The directory entry 206 points to a page table 210. Bits 21:12 represent the table field 208, which points to a page table entry 212 located in the page table 210. Bits 11:0 represent the page offset 214.

The page offset field 214 of the virtual memory address translates directly to bits 11:0 in the physical memory address (i.e., bits 11:0 pass-through). The set field within the physical memory address 218 includes bits 16:12, which is defined as a correlation field 222. Bits 11:5 in the set field of the physical memory address is identical to bits 11:5 in the virtual memory address because of the pass-through.

In one embodiment, the computer system is configured with a Pentium™ microprocessor, available from Intel, an Intel 82496 cache controller and a second level cache (L2 cache). This L2 cache has 32-byte cache lines and is controlled by the Intel 82496 cache controller configured as follows: 256K cache with LR=1, tags=8K, L/S=1, configuration number one. The line ratio (LR) is the ratio between the 82496 cache controller/82491 cache SRAM line size and that of the Pentium processor. Thus, LR=1 means that the L2 cache uses the same line size as the Pentium processor uses for its built in L1 cache.

Lines per sector (L/S) indicates whether or not the cache is sectored or non-sectored. When LS=1, a non-sectored cache is used.

While a cache controller will embody LR and L/S in some form (implicitly or explicitly), the terminology used for both of these concepts may be different. The specification of the exact settings for the Intel 82496 cache controller is for illustrative purposes only, and in no way reflects the scope of the present invention. This cache configuration interprets the physical address as having a tag field (31:17), a set field (16:5), and a subline field (4:0).

For further information on the Pentium™ Microprocessor and how to configure the Pentium™ to the Intel 82496 Cache controller, please see Pentium Processor User's Manual vol. 3, Protected Mode Memory Management, Section 11.3 (pp. 11–18 to 11–19). Also, see Pentium Processor User's Manual vol. 2, Cache Nodes Configuration, 4.2 (pp. 4–4 to 4–7). Please note especially FIG. 4—4 and Table 4–3.

In this embodiment, the correlation field 222 (bits 16:12) contains the critical bits that are in the set field 218 of the physical address but not in the offset bit field 214 of the virtual memory address. This invention focuses on using this correlation field (bits 16:12) in both the virtual memory address and the physical address to improve the mapping from a virtual to a physical address.

However, the number of "critical" bits and their placement within the virtual memory address and the physical memory address will vary for different operating systems and/or hardware configurations. However, the present invention can be tailored for each operating system and configuration or expanded to work on all configurations. In this particular implementation, five bits (namely 16:12) are the critical bits designated the correlation field.

The present invention provides a method to map a virtual memory address to a physical memory address that maintains a one-to-one correspondence between a correlation field of the physical memory address and a corresponding correlation field of the virtual memory address. For example, in FIG. 3, the correlation field 222, as defined by bits 16:12, are maintained in a one-to-one correspondence by the operating system when it maps a virtual memory address into a physical memory address.

This one-to-one correspondence may be carried out by a true identity of the bits 16:12. In other words, bits 16:12 may map exactly from the virtual memory address into the physical memory address (i.e., pass through). In another embodiment maintaining this one-to-one correspondence is implemented by adding an offset to each unique 16:12 correlation field, performing a modulo operation, and mapping the correlation field of the virtual memory address into the corresponding correlation field calculated by the addition of the offset and the modulo operation.

TABLE 1

| Virtual Address | Offset of 0 | Offset of 1 | Offset of 12 |
|---|---|---|---|
| 00000 | 00000 | 00001 | 01100 |
| 00001 | 00001 | 00010 | 01101 |
| 00010 | 00010 | 00011 | 01110 |
| 00011 | 00011 | 00100 | 01111 |
| 00100 | 00100 | 00101 | 10000 |
| 00101 | 00101 | 00110 | 10001 |
| 00110 | 00110 | 00111 | 10010 |
| 00111 | 00111 | 01000 | 10011 |
| 01000 | 01000 | 01001 | 10100 |
| 01001 | 01001 | 01010 | 10101 |
| 01010 | 01010 | 01011 | 10110 |
| 01011 | 01011 | 01100 | 10111 |
| 01100 | 01100 | 01101 | 11000 |
| 01101 | 01101 | 01110 | 11001 |
| 01110 | 01110 | 01111 | 11010 |
| 01111 | 01111 | 10000 | 11011 |
| 10000 | 10000 | 10001 | 11100 |
| 10001 | 10001 | 10010 | 11101 |
| 10010 | 10010 | 10011 | 11110 |
| 10011 | 10011 | 10100 | 11111 |
| 10100 | 10100 | 10101 | 00000 |
| 10101 | 10101 | 10110 | 00001 |
| 10110 | 10110 | 10111 | 00010 |
| 10111 | 10111 | 11000 | 00011 |
| 11000 | 11000 | 11001 | 00100 |
| 11001 | 11001 | 11010 | 00101 |
| 11010 | 11010 | 11011 | 00110 |
| 11011 | 11011 | 11100 | 00111 |
| 11100 | 11100 | 11101 | 01000 |
| 11101 | 11101 | 11110 | 01001 |
| 11110 | 11110 | 11111 | 01010 |
| 11111 | 11111 | 00000 | 01011 |

TABLE 2

| Virtual Address | Offset of 0 | Offset of 1 | Offset of 12 |
|---|---|---|---|
| 0 | 0 | 1 | 12 |
| 1 | 1 | 2 | 13 |
| 2 | 2 | 3 | 14 |
| 3 | 3 | 4 | 15 |
| 4 | 4 | 5 | 16 |
| 5 | 5 | 6 | 17 |
| 6 | 6 | 7 | 18 |
| 7 | 7 | 8 | 19 |
| 8 | 8 | 9 | 20 |
| 9 | 9 | 10 | 21 |
| 10 | 10 | 11 | 22 |
| 11 | 11 | 12 | 23 |
| 12 | 12 | 13 | 24 |
| 13 | 13 | 14 | 25 |
| 14 | 14 | 15 | 26 |
| 15 | 15 | 16 | 27 |
| 16 | 16 | 17 | 28 |
| 17 | 17 | 18 | 29 |
| 18 | 18 | 19 | 30 |
| 19 | 19 | 20 | 31 |
| 20 | 20 | 21 | 0 |
| 21 | 21 | 22 | 1 |
| 22 | 22 | 23 | 2 |
| 23 | 23 | 24 | 3 |
| 24 | 24 | 25 | 4 |
| 25 | 25 | 26 | 5 |
| 26 | 26 | 27 | 6 |
| 27 | 27 | 28 | 7 |
| 28 | 28 | 29 | 8 |
| 29 | 29 | 30 | 9 |
| 30 | 30 | 31 | 10 |
| 31 | 31 | 0 | 11 |

Tables 1 and 2 show numerical examples of adding an offset to the correlation field of the virtual address and producing a corresponding correlation field for the physical address. Table 1 indicates in the first column the correlation field within the virtual address. The second column indicates an offset of zero (i.e., true identity) in which the correlation field passes through from the virtual memory address into the physical memory address. The third column represents the corresponding correlation field in the physical memory address with an offset of 1. Similarly, in column four, the entries represent the corresponding correlation field of the physical memory address with an offset of 12.

Table 2 shows the identical information as Table 1, except that all the values are in decimal instead of binary notation. Column 1 shows the correlation field within the virtual address. Column 2 shows the corresponding correlation field in a physical address with an offset of zero. Column 3 shows the corresponding physical correlation field within the physical memory address with an offset of 1. Column 4 shows the corresponding correlation field within the physical memory address with an offset of 12.

To implement this one to one correspondence of the correlation fields in mapping from virtual to physical memory, management of the free physical pages in memory is essential. This management of free pages will be discussed in detail with respect to FIGS. 4, 5B and 6B.

As discussed in the Background, a standard operating system kernel uses a simple linked list to manage most of the pages in memory in the computer system. There is one pointer, free_page_list, which points to the first free page in the list. The first word of each free page functions as the pointer to the next free page. In addition, there is a variable, nr_free_pages, which gives the current number of pages in the list pointed to by free_page_list. A routine called get_free_page() allocates a page from the list, and free_page() puts a page back onto the list. Page management procedures and routines that allocate and de-allocate free pages from a single list of free pages are known in the computer arts.

To implement the present invention in an operating system's kernel, several modifications are made to standard operating system procedures. First, free_page_list is expanded into an array of thirty-two pointers, each pointing to a list of free pages. In other words, instead of having only one free page list, the modified kernel had thirty-two separate free page lists. Second, during initialization of the system, pages are sorted onto the thirty-two free page lists, each pointed to by free_page_list[31:0] respectively, according to bits 16:12 of the virtual memory address.

In the prior art, the virtual address which would be associated with the physical page was not previously available to the physical page allocation routine. This is because, prior to this invention, there was no reason for the physical page allocation routine to "know" the virtual address which the calling routine anticipated associating with the page it sought to obtain.

In an embodiment of this invention in an operating system's kernel, the virtual address is shared with the physical page allocation routine through a set of global variables in the kernel. One variable (user_virtual_address) is set to the anticipated virtual address for the page, and another variable (user_virtual_flag) is used as a Boolean flag (true/false) to indicate if the user_virtual_address variable has been set to an address for this particular call to the physical page allocation routine.

This particular method of sharing the virtual address with the physical page allocation routine has the virtue of being easy to implement in an existing operating system's kernel. Other methods, such as parameter passing, may be used instead of global variable utilization. Such a method would be more time consuming to implement, but may be favored for other reasons. Either method may be used to implement the present invention.

For those pages not allocated by user processes, no modifications are made to the operating system to share the virtual address with the physical page allocation routine. Modifying the operating system to share the virtual addresses for operating system pages is a straight forward task for those skilled in the art.

In one embodiment of the present invention, the page allocation routine is modified to evenly distribute its allocation of pages across the available correlation field values when the virtual address was not made available to it.

In this embodiment of the invention, access to the virtual address is not necessary. This scheme works particularly well because the only "unknown" virtual addresses came from the operating system. Thus, the present invention effectively ensures an even distribution for free pages for both user processes and system calls. For user processes, the virtual addresses are examined directly for a correlation field value. For the operating system, an even distribution of free pages was obtained by stepping through the free-page memory lists in a round-robin fashion.

These two embodiments work well in concert, as in the preferred embodiment. However, either method may be chosen exclusively for use in a system. Both of these embodiments will be described in further detail with reference to FIG. 5*b*.

In one embodiment, a page allocation routine, get_free_page, and a page de-allocation routine, free_page, have access to the virtual addresses.

The get_free_page routine is modified to use the virtual address information (when supplied) to select pages from the list corresponding to bits 16:12 of the virtual address (the correlation field).

The free_page() routine was modified to return pages to the appropriate free_page_list according to bits 16:12, the correlation field, of the physical memory address.

Figure 4:
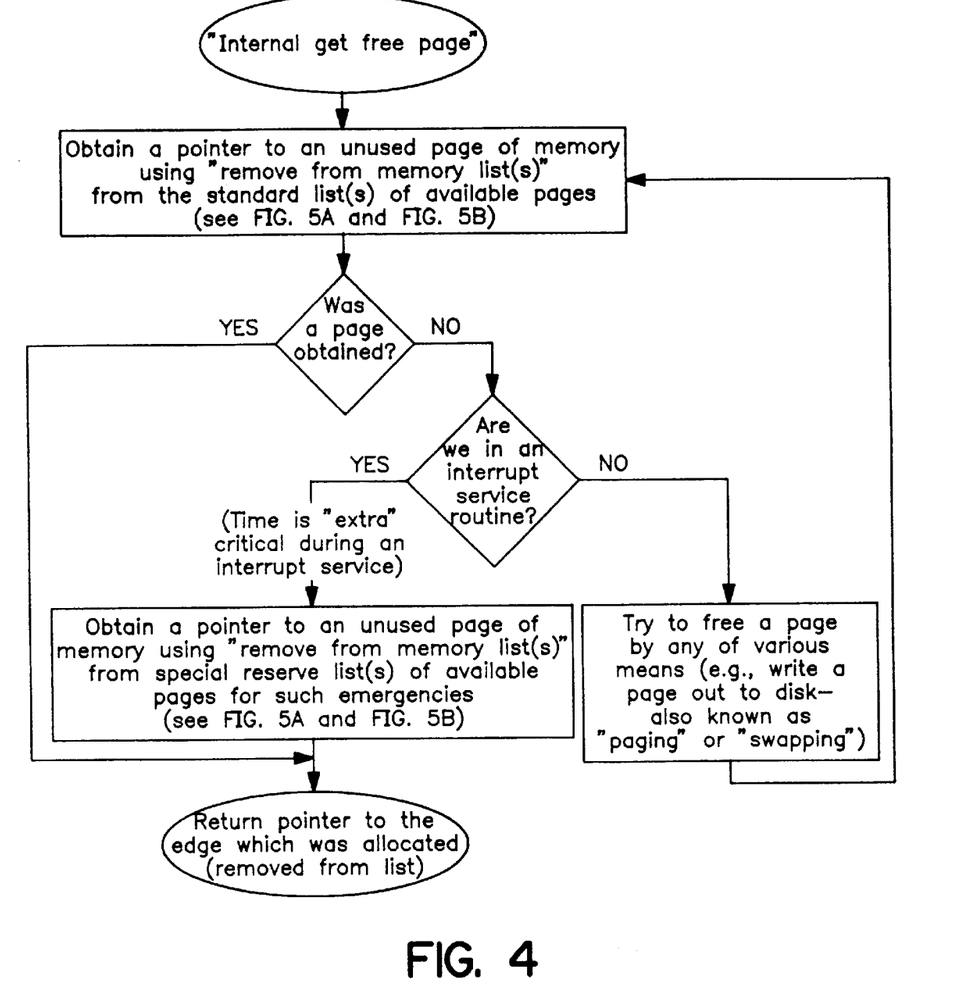
FIG. 4 is a flowchart showing a page allocation routine in which the present invention can be implemented.

FIG. 4 shows a flowchart of the steps that occur when get_free_page() is called. First, the procedure obtains a pointer to an unused or free page of memory from the standard list(s) of available pages. This step consists of removing from the memory list(s) the free page, which will be described in further detail in FIGS. 5A and 5B.

If a free or unused page was obtained, then the procedure returns a pointer to that page which was removed from the list(i.e., allocated). If a page is not obtained, then the procedure checks if get_free_page() is called from an interrupt service routine.

If get_free_page() was not called from an interrupt service routine, then the procedure tries to free a page by the standard means known in the art. For example, the operating system may de-allocate a page by writing a page out to disk or by performing any number of other paging/swapping operations.

Figure 5A:
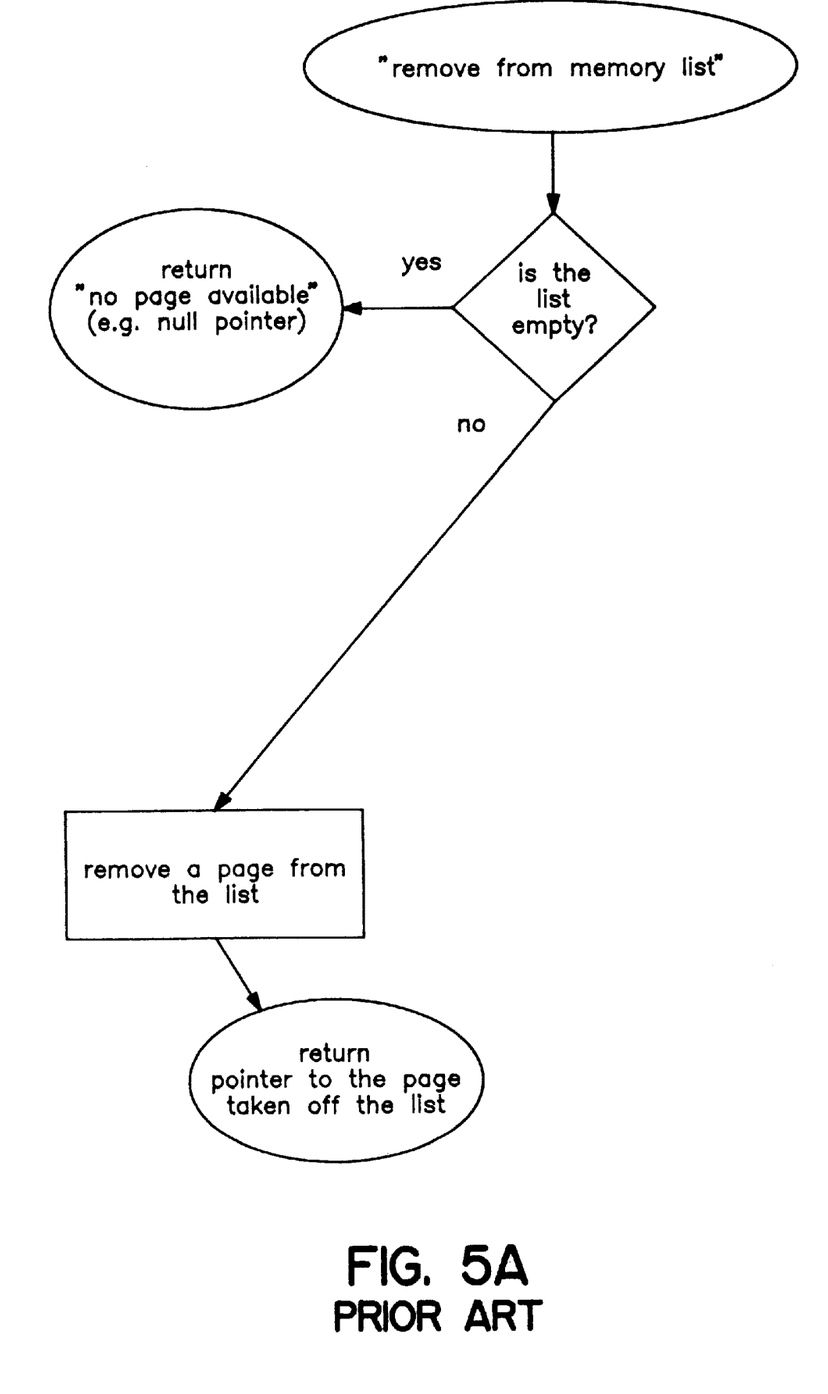
FIG. 5A is a flowchart of how the prior art removed a free page from free page memory list.
Figure 5B:
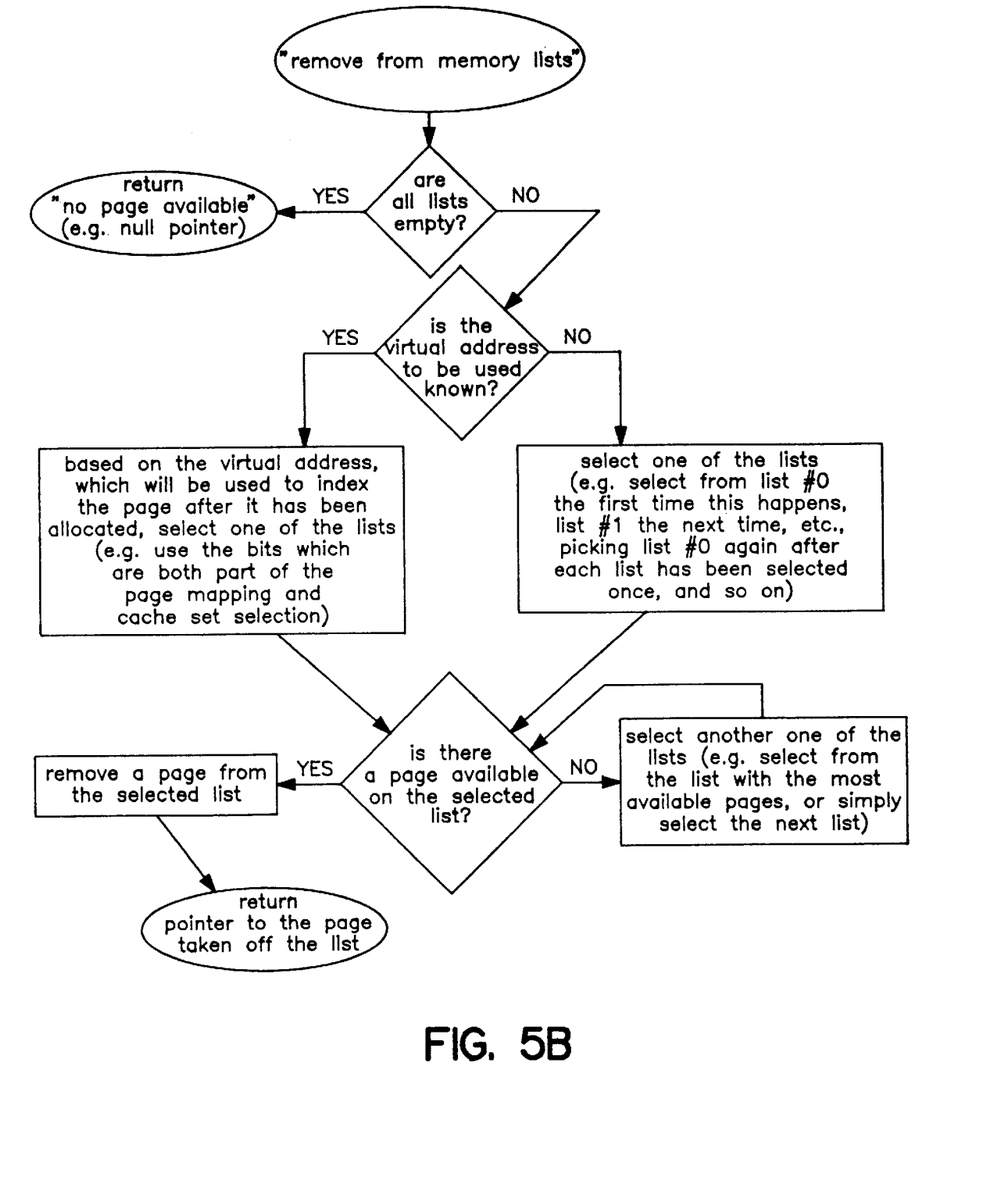
FIG. 5B is a flowchart of how the present invention selects the proper list from the $2^x$ free page memory lists, and removes a free page from that list.

If get_free_page() is called from an interrupt service routine, then the procedure obtains a pointer to a free page of memory from special reserved list(s) of available pages using the steps to be outlined in FIG. 5A or 5B.

FIG. 5A illustrates how the prior art removes a free page from its single memory list. The prior art first checks to see whether the list is empty. If the list is empty, then get_free_page() will return a null pointer indicating that no free page is available. If, on the other hand, the list is not empty, then get_free_page() removes a page from the list and returns the pointer to that page.

The present invention is embodied in FIG. 5B. Instead of having only one list, the present invention uses a number of lists. In an operating system, using the type of cache and cache controller configured as specified above, thirty-two lists were used as the number of lists.

FIG. 5B illustrates how the present invention allocates free pages. First, the procedure checks to see whether or not all lists are empty. If all the lists are empty, then a null pointer is returned to the get_free_page procedure indicating that no pages were available. If not all lists were empty, then the procedure checks to see if the virtual address to be used is known.

If the virtual address is not known, then the procedure selects one of the thirty-two lists in a sequential fashion. For example, the first time a virtual address to be used is not known, list number zero is selected. The next incident when the virtual address is not known, list number one is selected. This continues until each list (free_page_list[31:0]) has been selected once and then wraps back and continues again by selecting list number zero.

It should be noted that the present invention may be implemented without ever having access to the virtual addresses. In other words, significant performance improvement may be obtained by maintaining 32 separate lists and allocating free pages from these lists in a round-robin fashion. It also should be noted that allocation of the free pages in any fashion that would result in an even distribution of the allocated free pages may be used.

Furthermore, since even distribution on each user and/or system process is important, get_free_page may be further modified to track the free page allocation for each process separately. In other words, a separate pointer for each process that keeps track of the next list from which to allocate a free page may be implemented in the page management routine.

If the virtual address to be used is known, then based on the virtual address, the procedure selects one of the lists to allocate a page from. The correlation field of the virtual address is used to select from which one of the lists to take a free page.

It should be appreciated that the present invention may be embodied such that the virtual address is always known, and the round-robin allocation is never performed. In the case where the virtual address is always known, the "no" branch, shown in FIG. 5B from the box entitled "Is the Virtual Address to be Used Known?" is never taken.

Whether or not the virtual address to be used is known, after the previous branch is completed, the procedure checks to see if there is a page available on the selected list. If there is no page available on that list, then the procedure selects another list. For example, the procedure may select from the list with the most available pages, or simply select the next list. If that particular list does not have any available pages, then the preceding step is repeated until a free page is found.

If there is a page available on the selected list, then get_free_page removes a page from the selected list and returns a pointer to that page.

Figure 6A:
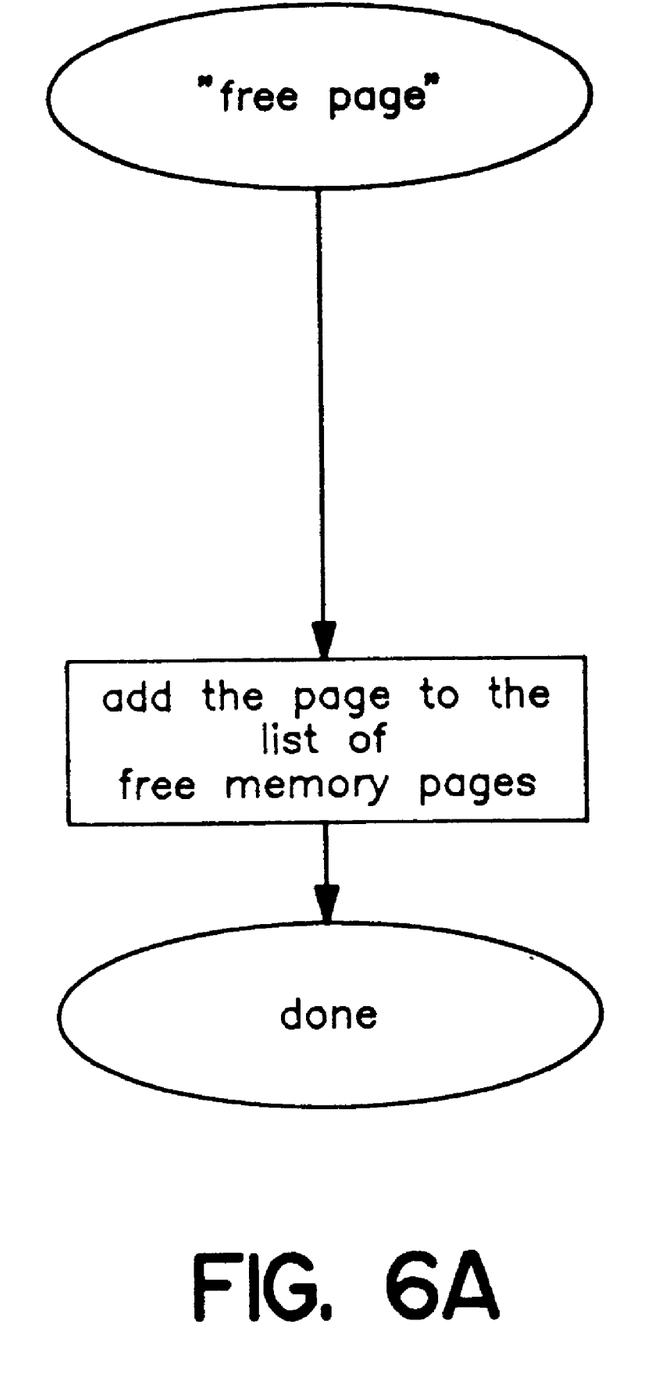
FIG. 6A is a flow chart of how the prior art adds a free page to its memory list.

Referring to FIG. 6A, this flowchart illustrates how the prior art added a free page to the list of free memory pages (i.e., de-allocates pages).

Figure 6B:
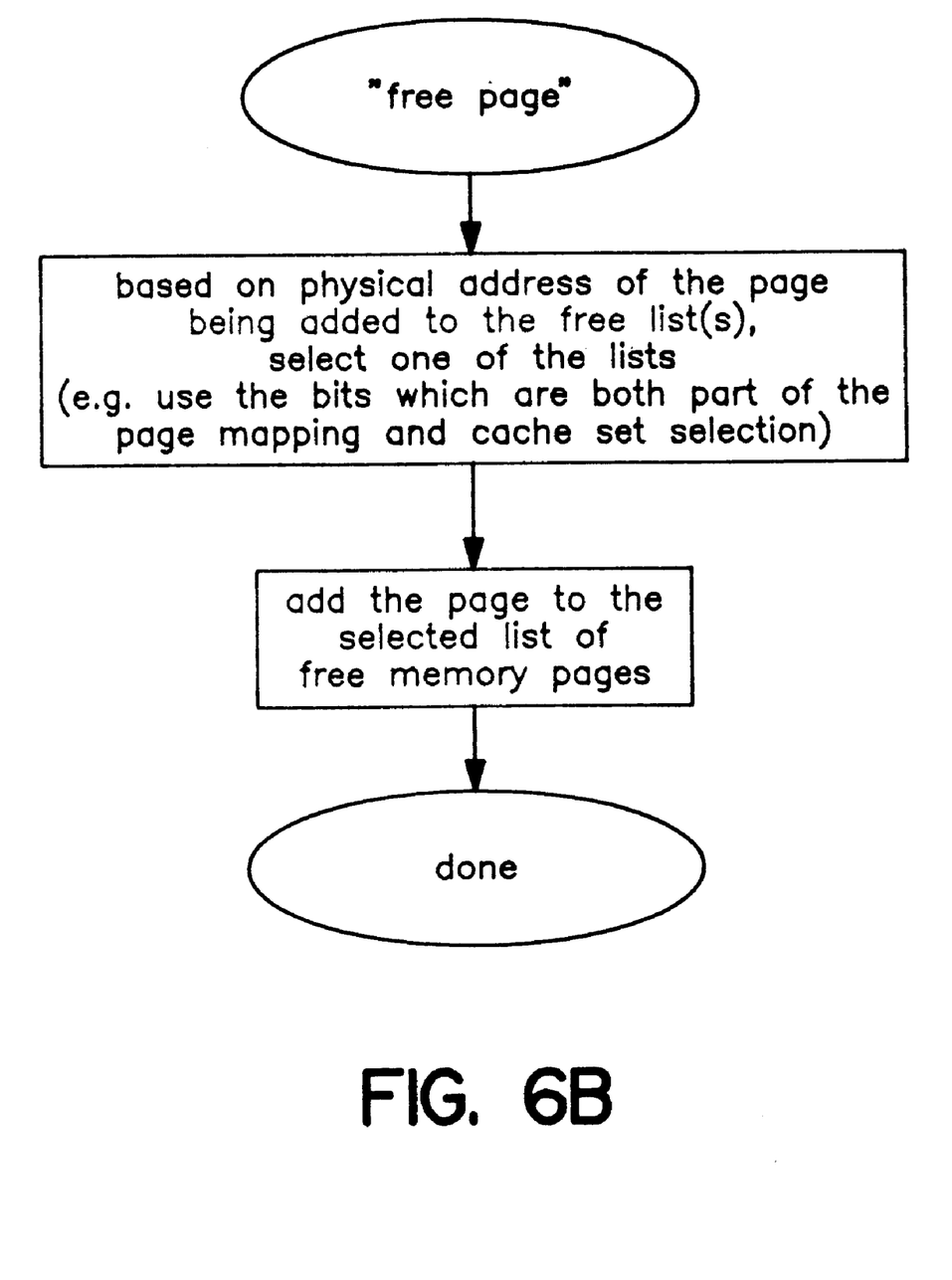
FIG. 6B is a flow chart of how the present invention adds a free page to the appropriate memory list.

FIG. 6B illustrates how the present invention de-allocates pages. In the present invention, since there are thirty-two free lists, the procedure must select the appropriate free list to which to add the free page. Based on the correlation field in the physical address of the page, free-page selects one of the lists on which to append the free page. The correlation field in this embodiment includes those the critical bits 16:11 in the physical and virtual addresses.

The amount of executable code added to implement this method into an operating system's kernel is negligible, and the impact on operating system performance is minimal.

In the foregoing specification, the invention has been described with reference to specific exemplary embodiments thereof. It will however be evident that various modifications and changes made be made thereto without departing from the broader spirit and scope of the invention as set forth in the appended claims. The specification and drawings are accordingly to be regarded as illustrative rather than restrictive.

What is claimed is:

1. A method of managing pages in an operating system that maps a virtual memory address to a corresponding physical memory address, said method of managing pages comprising the steps of:

a) defining a correlation field in the virtual memory address and a correlation field in the physical memory address;

b) maintaining at least two free-page lists;

c) allocating a free page from a free page list designated by the correlation field of the virtual memory address if the virtual memory address is known; and d) de-allocating a free page to a free page list designated by the correlation field in the physical memory address.

2. The method of claim 1 wherein the step of allocating a free page from a free page list designated by the correlation field of the virtual memory address if the virtual memory address is known includes the steps of:

a) determining if all the free page lists are empty;

b) if so, returning a null pointer;

c) else, determining if a virtual address is known;

d) if yes, employing the virtual address to select one of the free page lists from which to allocate a free page;

e) else, selecting a next free page list;

f) determining if there is a page available on the selected list;

g) if yes, removing a free page from the selected free page list and allocating the free page;

h) else, returning to step (e).

3. The method of claim 1 wherein the step of de-allocating a free page to the free page lists comprises the steps of:

a) selecting one of the free page lists based on the correlation field of the physical address; and b) adding the free page to the selected list of the free page lists.

4. The method of claim 3 wherein the step of selecting one of the free age lists based on the correlation field of the physical address includes the step of:

employing bits in the physical address that are used in page mapping and cache set selection.

5. The method of claim 1 wherein the correlation field of the virtual memory address and the correlation field in the physical memory address include N bits, and there are $2^N$ free-page lists.

6. The method of claim 5 wherein N=5.

7. The method of claim 1 wherein the correlation fields of the virtual address and the physical memory address are bits 16 through 12 (16:12).

8. The method of claim 7, wherein selecting a next free page list includes the step of finding a free page list having a greater number of unallocated free pages than the remaining free page lists.

9. In an operating system that maintains at least two free page lists, a method of allocating free pages comprising the steps of:
   a) determining if all the free page lists are empty;
   b) if so, returning a null pointer;
   c) else, determining if a virtual address is known;
   d) if yes, employing a correlation field in the virtual address to select one of the free page lists from which to allocate a free page;
   e) else, selecting a next free page list;
   f) determining if there is a page available on the selected list;
   g) if yes, removing a free page from the selected list and allocating that free page;
   h) else, returning to step (e).

10. The method of claim 9, wherein selecting a next free page list includes the step of finding a free page list having a greater number of unallocated free pages than the remaining free page lists.

11. The method of claim 9, wherein each list is configured as a linked list, with each free page pointing to the next free page.

12. The method of claim 9, wherein each list is configured as a ring, said ring configuration implemented by the steps of:
   a) defining a first variable that points to the beginning of the list;
   b) defining a second variable that points to the end of the list;
   c) allocating free pages from the beginning of the list using the first variable; wherein a page allocated from the ring is the least recently used of the free pages in that list; and
   d) adding free pages to the end of the list using the second variable.

* * * * *

UNITED STATES PATENT AND TRADEMARK OFFICE
CERTIFICATE OF CORRECTION

PATENT NO.     : 5,897,660
DATED          : April 27, 1999
INVENTOR(S)    : Reinders et al.

It is certified that error appears in the above-identified patent and that said Letters Patent is hereby corrected as shown below:

Column 2,
Line 4, delete "-".

Column 12,
Line 56, delete "age" and insert -- page --.

Signed and Sealed this

Thirtieth Day of September, 2003

JAMES E. ROGAN
*Director of the United States Patent and Trademark Office*